US007031468B2

(12) United States Patent
Hoffstein et al.

(10) Patent No.: US 7,031,468 B2
(45) Date of Patent: Apr. 18, 2006

(54) SPEED ENHANCED CRYPTOGRAPHIC METHOD AND APPARATUS

(75) Inventors: Jeffrey Hoffstein, Pawtucket, RI (US); Joseph H. Silverman, Needham, MA (US)

(73) Assignee: NTRU Cryptosystems, Inc., Burlington, MA (US)

( * ) Notice: Subject to any disclaimer, the term of this patent is extended or adjusted under 35 U.S.C. 154(b) by 829 days.

(21) Appl. No.: 09/939,531

(22) Filed: Aug. 24, 2001

(65) Prior Publication Data

US 2002/0041681 A1    Apr. 11, 2002

Related U.S. Application Data

(60) Provisional application No. 60/228,572, filed on Aug. 29, 2000.

(51) Int. Cl.
  *H04L 9/00* (2006.01)
  *G06F 1/02* (2006.01)

(52) U.S. Cl. .............................. 380/28; 380/44; 708/255

(58) Field of Classification Search .................. 380/28; 713/156, 175, 176; 708/255
    See application file for complete search history.

(56) References Cited

U.S. PATENT DOCUMENTS

| | | | | |
|---|---|---|---|---|
| 4,232,194 A | * | 11/1980 | Adams | 380/28 |
| 4,935,877 A | | 6/1990 | Koza | 364/513 |
| 5,136,686 A | | 8/1992 | Koza | 395/13 |
| 5,148,513 A | | 9/1992 | Koza et al. | 395/13 |
| 5,343,554 A | | 8/1994 | Koza et al. | 395/13 |
| 5,517,511 A | * | 5/1996 | Hardwick et al. | 714/755 |
| 5,764,771 A | * | 6/1998 | De Vito et al. | 380/28 |
| 5,889,868 A | * | 3/1999 | Moskowitz et al. | 713/176 |
| 5,987,129 A | * | 11/1999 | Baba | 380/279 |
| 6,031,911 A | * | 2/2000 | Adams et al. | 380/29 |
| 6,487,301 B1 | * | 11/2002 | Zhao | 382/100 |

OTHER PUBLICATIONS

Con Coppersmith and Gadiel Seroussi, On the Minimum Distance of Some Quadratic Residue Codes, IEEE Transactions on Information Theory, vol. IT-30 No. 2 Mar. 1984, pp. 407-411.
Finite Field and Elliptic Curve Systems, Stinson Cryptography Theory and Practice, pp. 177-190.
Jerome A. Solinas, Designs, Codes and Cryptography, 19, 195-249 (2000), Efficient Arithmetic on Koblitz Curves, , pp. 125-179.
Chapter 14 Exponentiation, Menezen Van Oorschot and Vanstone, Handbook of Applied Cryptography, pp. 613-628.
The Powering Algorithms, Henri Cohen, A Course in Computational Number Theory, pp. 8-12.
Chae Hoon Lim et al., Sparse RSA Secret Keys and Their Generation, pp. 1-15. (preprint).
D.R. Stinson, Some Baby-step giant-step algorithms for the low hamming weight discrete logarithm problem, , pp. 1-15.
What is a Random Sequence?, pp 149-179.
Evaluation of Powers, pp. 461-481.
Darrel Hankerson, Software Implementation of Elliptic Curve Cryptography over Binary Fields, pp. 1-24. (2000).
Jeffrey Hoffstein, NTRU: A Ring-Based Public Key Cryptosystem, et al. pp. 268-288.
Peter de Rooij, On the Security of the Schnorr Scheme Using Preprocessing, Eurocrypt, pp. 71-80, (1998).
C.P. Schnorr, Efficient Identification and Signatures for Smart Cards, pp. 239-252, (1998).
Jeffrey Hoffstein, NSS: An NTRU Lattice-Based Signature Scheme.
Daniel M. Gordon, A Survey of Fast Exponentiation Methods, Dec., 1997, Journal of Algorithms 27 (1998), 129-146, pp. 1-22.
Menezes, et al., Hanbook of Applied Cryptography, CRC Press, 1997, Chapter 7, 63-85.

* cited by examiner

*Primary Examiner*—Kambiz Zand
(74) *Attorney, Agent, or Firm*—Martin Novack

(57) ABSTRACT

A method for performing a cryptographic operation involving transforming digital information is described. A digital operator is provided that has a component selected from a large set of elements. The component is expanded into a plurality of factors, each factor having a low Hamming weight. Digital information is transformed using the digital operator. Computer readable medium embody instructions for the method.

33 Claims, No Drawings

US 7,031,468 B2

SPEED ENHANCED CRYPTOGRAPHIC METHOD AND APPARATUS

REFERENCE TO RELATED APPLICATIONS

This patent application claims priority from U.S. Provisional Application Ser. No. 60/228,572, filed Aug. 29, 2000.

FIELD OF THE INVENTION

The present invention relates generally to a method and apparatus to efficiently compute powers and multiples of quantities that are useful for cryptographic purposes such as, for example, key generation, encryption, decryption, authentication, identification, and digital signatures.

BACKGROUND OF THE INVENTION

Modern cryptographic methods require massive numbers of basic arithmetic operations such as addition, subtraction, multiplication, division, remainder, shift, and logical 'and', 'or', and 'xor'. Many of these methods require computation of powers $A^k$ (respectively multiples k*A) for a value k that is selected at random from a large set of possible values.

Heretofore a variety of methods have been proposed and implemented for computing powers $A^k$ (respectively multiples k*A) for a specified value of k (H. Cohen, *A Course in Computational Number Theory*, GTM 138, Springer-Verlag, 1993 (Section 1.2)), (D. Gordon, *A survey of fast exponentiation methods*, Journal of Algorithms 27 (1998), 129–146), (D. Knuth, *The Art of Computer Programming*, Volume 2, Seminumerical Algorithms, 3rd ed., Addison-Wesley, 1998 (Section 6.4.3)), (A. J. Menezes, et al., *Handbook of Applied Cryptography*, CRC Press, 1997 (Section 14.6)).

One type of rapid computational method which has been used is to write k as a sum of powers of two to reduce the computation to multiplications and squarings (respectively additions and doublings).

A second type of rapid computational method which has been used is to write k as a sum of plus and minus powers of two to reduce the computation to multiplications, inversions, and squarings (respectively additions, subtractions, and doublings).

A third type of rapid computational method which has been used is to write k as a sum of small multiples of powers of two to reduce the computation to multiplications, small powers, and squarings (respectively additions, subtractions, small multiples, and doublings).

A fourth type of rapid computation method which has been used is to write k as a sum of powers of a special multiplier t, where t has the property that raising to the t power (respectively multiplying by t) takes very little time compared to multiplication (respectively addition or subtraction). A particular instance of this method is writing k as a sum of powers of the p-power Frobenius map on the group of points $E(GF(p^m))$ on an elliptic curve E defined over the finite field GF(p).

A fifth type of rapid computation method which has been used (called the factor method (Knuth, supra, Section 4.6.3, page 463 and exercise 3)) is to write a given integer k as a product of factors which are themselves written using one of the previously described methods.

All of these methods allow reasonably rapid computation of powers $A^k$ (or multiples k*A) for all or most values of k, but many users would find it desirable to have a method which allows even more rapid computation of powers $A^k$ (or multiples k*A) with k taken from a sufficiently large set of allowable values.

SUMMARY OF THE INVENTION

In many cryptographic operations one uses a random power or multiple of an element in a group or a ring. The present invention provides a method, system and apparatus for transforming digital information that uses a fast method to compute powers and multiples in certain important situations including, for example, powers in the Galois field $F_{2^n}$, multiples on Koblitz elliptic curves, multiples in NTRU convolution polynomial rings, and the like. In accord with the invention, for example, an exponent or multiplier is expressed as a product of factors, each of which has low Hamming weight when expanded as a sum of powers of some fast operation. This is useful in many cryptographic operations including, for example, key generation, encryption, decryption, creation of a digital signature, verification of a digital signature, creation of a digital certificate, authentication of a digital certificate, identification, pseudorandom number generation and computation of a hash function, and the like, particularly in operations where a random exponent or multiplier is utilized.

Thus, the present invention provides a method, system and apparatus for performing a cryptographic operation that comprises transforming digital information by operating with a digital operator having a component selected from a large set of elements, wherein the component has a low Hamming weight. Typically, components are selected to have a Hamming weight less than about 30, preferably less than about 20, more preferably less than about 15, and most preferably less than about 10. Preferably, the digital operator comprises a component having a plurality of factors, each factor having a low Hamming weight. By using a digital operator having one or more components in accord with the present invention, the transforming step can be performed at increased speed compared to the transforming step using prior art elements. A component in accord with the present invention is formed as a product of factors, each of which has low Hamming weight when expanded as a sum of powers of some fast operation (as performed by a suitable computing device such as, for example, a cpu, microprocessor or computer, or the like).

In accord with the present invention, powers $A^k$ (or multiples k*A) can be computed very rapidly with k chosen from a large set of possible elements. Computation in accord with methods of the present invention typically is considerably faster than the most widely used methods presently in use.

In one embodiment of the invention, the computational technique for an exponential component (or for a component having multiplied elements) uses products of specially selected elements to speed the exponential calculations (or multiplication calculations) of the method. The computational complexity of computing a power $A^{k(1)k(2)\ldots k(r)}$ (or a multiple $k(1)k(2)\ldots k(r)*A$) is proportional to the sum of the computational complexity of computing the powers $A_1^{k(1)}, \ldots, A_r^{k(r)}$ (or the multiples $k(1)*A_1, \ldots, k(r)*A_r$), although the number of possible powers (or multiples) is approximately equal to the product of the number of allowed values for $k(1), \ldots, k(r)$. The fact that the computational complexity increases proportionally to the sum of the individual computational complexities although the size of the set of possible values of $A^k$ (respectively k*A) increases proportionally to the product of the number of allowed values for k(1), ..., k(r) helps to explain why the invention provides an improved computational method. The method is especially effective in situations wherein there is an element t for which powers $A^t$ (or multiples t*A) can be computed rapidly. Preferably, k(1), ..., k(r) are chosen to be low Hamming weight polynomials in the element t.

The present invention also provides a computer readable medium containing instructions for performing the above-described methods of the invention.

DEFINITIONS

The following definition is used for purpose of describing the present inventions. A computer readable medium shall be understood to mean any article of manufacture that contains data that can be read by a computer excluding a carrier wave signal carrying data that can be read by a computer. Such computer readable media includes but is not limited to magnetic media, such as floppy disk, a flexible disk, a hard disk, reel-to-reel tape, cartridge tape, cassette tape or cards; optical media such as CD-ROM and writeable compact disc; magneto-optical media in disc, tape or card form; paper media, such as punched cards and paper tape.

The term "large set" as used herein shall mean a set of elements that is large enough to prevent someone from checking, within a predetermined time or in less than a predetermined minimum number of operations, the elements of the set to discover a randomly chosen element in the set that is used in a cryptographic operation. The longer the time or larger the minimum number of operations required to discover the chosen element, the more secure is the cryptographic operation.

DETAILED DESCRIPTION OF THE INVENTION

There are many cryptographic methods that require a random power $A^k$ or random multiple k*A, where k is an element of a ring R and A is an element of an R-module M. Exemplary methods requiring such random powers or multiples include Diffie-Hellman key exchange (U.S. Pat. No. 4,200,770), (Menezes, supra, section 12.6.1), ElGamal public key cryptography (Menezes, supra, section 8.4), the digital signature standard (DSS) [U.S. Pat. No. 5,231,668], (Menezes, supra, section 11.5.1), the NTRU® public key cryptosystem (U.S. Pat. No. 6,081,597), (J. Hoffstein, et al., *NTRU: A new high speed public key cryptosystem,* in Algorithmic Number Theory (ANTS III), Portland, Oreg., June 1998, Lecture Notes in Computer Science 1423 (J.P. Buhler, ed.), Springer-Verlag, Berlin, 1998, 267–288), and the NTRU® signature scheme (NSS) (J. Hoffstein, et al., *NSS: The NTRU Signature Scheme,* Proc. EUROCRYPT 2001, Lecture Notes in Computer Science, Springer-Verlag, 2001).

One variant of Diffie-Hellman, ElGamal, and DSS uses the ring R=Z of integers and the R-module $M=GF(p^m)^*$ of nonzero elements of a finite field. A second variant of Diffie-Hellman, ElGamal, and DSS uses the endomorphism ring R=End(A) of an abelian variety A and the R-module $M=A(GF(p^m))$ of points on A defined over a finite field. An instance of this variant is an elliptic curve A=E defined over the finite field GF(p) and an endomorphism ring R that includes Z and the p-power Frobenius map on $E(GF(p^m))$. The NTRU public key cryptosystem and NTRU signature scheme use a ring R=B[X]/I of polynomials with coefficients in a ring B modulo an ideal I and the R-module M=R. An instance of NTRU uses the convolution ring $R=(Z/qZ)[X]/(X^N-1)$.

The method of the invention involves choosing the quantity k from a set of elements of the ring R of the form $$k=k(1)*k(2)* \ldots *k(r)$$

wherein computation of the powers $A^{k(i)}$ (or multiples k(i)*A) is computationally fast for every element A of the R-module M and to compute the power $A^k$ (or multiple k*A) as the sequence of steps $$A_1=A^{k(1)}, A_2=A_1^{k(2)}, \ldots, A^k=A_r=A_{r-1}^{k(r)},$$

(respectively as the sequence of steps $$A_1=k(1)*A, A_2=k(2)*A_1, \ldots, A_r=k(r)*A_{r-1}.)$$

In one embodiment of the invention, a ring R contains an element t so that computation of the power $A^t$ (respectively multiple t*A) is computationally fast for every element A of the R-module M. Examples of this include:

(1) the multiplicative group of a finite field $M=GF(p^m)^*$ and the element t=p corresponding to raising to the $p^{th}$ power, $t(x)=x^p$;

(2) an elliptic curve E defined over a finite field GF(p), the group of points $M=E(GF(p^m))$ of E with coordinates in the extension field $GF(p^m)$, and the element t that is the $p^{th}$ power Frobenius element defined by $t(x,y)=(x^p,y^p)$;

(3) the ring of convolution polynomials $R=M=(Z/qZ)[X]/(X^N-1)$ and the element t=X corresponding to multiplication by X in the ring R, t(f(X))=X*f(X).

In the instance that the ring R contains such an element t, the elements k(i) preferably are chosen to be polynomials in t, $$a_0+a_1*t+a_2*t^2+ \ldots +a_n*t^n,$$

wherein the coefficients $a_0, \ldots, a_n$ are chosen from a restricted set. Exemplary choices for $a_0, \ldots, a_n$ are the sets {0,1} and {−1,0,1}. The latter is useful primarily when inversion (or negation) are computationally fast operations in M.

The effectiveness of the invention can be measured by the Hamming weight HW of a polynomial:

$$HW(a_0+a_1*t+ \ldots +a_n*t^n)=\# \text{ of } a_i \text{ that are nonzero.}$$

Because computation of $A^t$ (or t*A) takes negligible time, the time to compute $A^{k(i)}$ (or k(i)*A) for $k(i)=a_0+a_1*t+ \ldots +a_n*t^n$ is approximately $$\text{TimeToCompute}(A^{k(i)}) \approx HW(k(i)) \text{multiplications,}$$

respectively, $$\text{TimeToCompute}(k(i)*A) \approx HW(k(i)) \text{additions.}$$

The method of choosing k in the form k=k(1)*k(2)* ... *k(r) thus allows computation of $A^k$ (or k*A) in approximately $$\text{TimeToCompute}(A^k) \approx HW(k(1))+ \ldots +HW(k(r))+r-1$$
multiplications, respectively, $$\text{TimeToCompute}(k*A) \approx HW(k(1))+ \ldots +HW(k(r))+r-1 \text{ additions.}$$

Thus, the computational effort to compute $A^k$ (respectively k*A) is approximately proportional to the sum of the Hamming weights of the quantities k(1), ..., k(r).

If the polynomial coefficients $a_0, \ldots, a_n$ are chosen from the exemplary set $\{0,1\}$ and if the quantities $k(1), \ldots, k(r)$ are chosen to have Hamming weights $d_1, \ldots, d_r$, respectively, then the number of r-tuples $(k(1), \ldots, k(r))$ is $$C(n+1,d_1)*C(n+1,d_2)* \ldots *C(n+1,d_r),$$

where $C(n,d)=n!/d!*(n-d)!$ is the combinatorial symbol. Thus, the number of r-tuples $(k(1), \ldots, k(r))$ is the product of the number of individual values for each $k(i)$. Further, in many exemplary situations, experiments show that, if the product $C(n+1,d_1)* \ldots *C(n+1,d_r)$ is chosen to be smaller than the number of elements in the ring R, then most of the products $k(1)* \ldots *k(r)$ will be distinct. Hence, random powers $A^k$ (or multiples $k*A$) can be efficiently computed for all k in a large subset of R. The specific size of the subset may be adjusted by suitable choices of parameters, such as the parameters r and $d_1, \ldots, d_r$.

A generalization of the embodiment described is a ring R that contains several elements $t_1, \ldots, t_z$ so that computation of the power $A^t$ (or multiple $t*A$) is computationally fast for each $t=t_1, \ldots, t_z$ and for every element A of the R-module M, and in which the elements $k(i)$ are chosen to be polynomials in $t_1, \ldots, t_z$. Another generalization of the embodiment described is selection of elements $$k=k_1(1)* \ldots *k_1(r_1)+k_2(1)* \ldots *k_2(r_2)+ \ldots + k_w(1)* \ldots *k_w(r_w)$$

that are sums of products of elements $k_j(i)$ of the sort $k(i)$ previously described. Further generalizations will be readily apparent to those skilled in the art.

Additional details of the speed enhanced cryptographic techniques in accordance with the present invention are described in the examples below.

There are many cryptographic constructions in which one uses a random power or multiple of an element of a group or ring. A brief and far from complete list includes:

1. Diffie-Hellman Key Exchange

One takes an element g in a finite field F and computes a random power $g^k$ in F. Here k is an integer.

2. Elliptic Curve DH Key Exchange

One takes a point P in the group E(F) of points on an elliptic curve over a finite field and computes a random multiple kP. Here k may be an integer or a more general endomorphism of the group E(F).

3. DSS and ECDSS

The Digital Signature Standard (using a finite field or an elliptic curve) requires a random power $g^k$ or multiple kP in the signing portion of the algorithm. The verification process also require a power or multiple, but for specified values of k, not random values.

4. Classical ElGamal Public Key Cryptosystem

ElGamal key generation requires computation of a power $\beta=\alpha^j$ with a fixed base $\alpha$ and a randomly chosen exponent j that forms the secret key. Encryption requires computation of two powers $\alpha^k$ and $\beta^k$ to a randomly chosen exponent k. Decryption requires computation of a power $\gamma^j$.

5. Elliptic Curve ElGamal and Variants

Key generation requires computation of a multiple Q=jP with a fixed point P in E(F) and a randomly chosen multiplier j that forms the secret key. Encryption requires computation of two multiples kP and kQ to a randomly chosen multiplier k. Decryption requires computation of a multiple jR. Again k may be an integer or a more general endomorphism of the group E(F).

6. NTRU Public Key Cryptosystem

The private key includes a random polynomial f(X) in the ring $R_q=(Z/qZ)[X]/(X^N-1)$ of truncated polynomials modulo q. Encryption requires computation of a product r(X)h(X) in the ring R, where h(X) (the public key) is fixed and r(X) is random. Decryption requires computation of a product f(X)e(X) in the ring R, where e(X) is the ciphertext.

In accord with one embodiment of the invention, a general method is described that in many situations allows random multiples to be computed more rapidly than previously described methods. Although not universally applicable, it can be used for many of the algorithms in the above list, including Diffie-Hellman over Galois fields $F_2^n$, elliptic curve cryptography over Koblitz curves, and the NTRU cryptosystem. In accord with the invention, a random exponent or multiplier is formed as a product of factors, each of which has low Hamming weight when expanded as a sum of powers of some fast operation.

Briefly, in accord with the present invention, the random multiplier is written as a product of terms, each of which is a sum of terms that are relatively easily computed. These multipliers are referred to as Small Hamming Weight Products (SHWP), because each term in the product has low Hamming weight relative to an easily computed operation.

Low Hamming Weight Exponents

The use of low Hamming weight exponents has been studied in both RSA exponentiation (C. H. Lim, et al., *Sparse RSA keys and their generation,* preprint, 2000) and in discrete logarithm algorithms (D. Coppersmith, et al., *On the Minimum Distance of Some Quadratic Residue Codes,* IEEE Transactions on Information Theory, vol. IT-30, No. 2, March 1984, 407–411; D. R. Stinson, *Some baby-step giant-step algorithms for the low Hamming weight discrete logarithm problem,* Mathematics of Computation, to be published), but always in the context of taking a single exponent k of small Hamming weight. The present invention uses a product $k=k_1k_2 \ldots k_r$ of very low Hamming weight exponents and take advantage of the fact that the sample space of the product k is more-or-less the product of the sample spaces for $k_1, \ldots, k_r$, while the computational complexity (in certain situations) of computing $\alpha^k$ is the sum of the computational complexity of computing $\alpha_1^{k_i}$.

The usual binary method to compute $x^k$ requires approximately $\log_2 k$ squarings and HW(k) multiplications, where HW(k)=Hamming weight of k is the number of ones in the binary expansion of k. The use of addition chains for k will often yield an improvement although, for very large values of k, it is difficult to find optimal chains.

An idea to compute random powers by precomputing a list of powers, taking a product of a random subset, and gradually supplementing the list using intermediate calculations was described by C. P. Schnorr, *Efficient identification and signatures for smart cards,* in Advances in Cryptology (Crypto 89), Santa Barbara, Calif., August 1989, Lecture Notes in Computer Science 435, (G. Brassard, ed.), Springer-Verlag, Berlin, 1989, 239–252. Schnorr's method was broken by de Rooij at the parameter levels suggested in Schnorr (P. de Rooij, *On the security of the Schnorr scheme using preprocessing,* in Advances in Cryptology (Eurocrypt 90), Aarhus, Denmark, May 1990, Lecture Notes in Computer Science 473 (I. B. Damgard, ed.), Springer-Verlag, Berlin, 1990, 71–80).

Another method, the factor method, is briefly discussed by Knuth, supra (at 4.6.3, page 463 and exercise 3).

The present invention provides an improvement over those prior art methods for many applications. In one embodiment, for example, k is a product k=uv and, in accord with the present invention, $z=x^k$ is computed as $y=x^u$ and $z=y^v$. This process can be repeated and interspersed with the binary method or the use of other addition chains.

To illustrate another embodiment the present invention, let G be a group in which the quantity $x^k$ is to be computed. Suppose that we write the exponent k as a sum of products $$k = \sum_{i=1}^{d} k_i = \sum_{i=1}^{d} \prod_{n=1}^{N_i} K_{i,n}. \qquad (1)$$

We compute $x^k$ as the product $\Pi_i x^{k(i)}$, we compute each power $x^{k(i)}$ using the factor method with $k_i = \Pi_n K_{i,n}$, and we compute each power $y^{K(i,n)}$ ($K(i,n) = K_{i,n}$) by using (say) the binary method. This requires approximately $\log_2(k)$ squarings and approximately $$d - 1 + \sum_{i=1}^{d} \sum_{n=1}^{N_i} (HW(K_{i,n}) - 1) \text{ multiplications.} \qquad (2)$$

For small values of k, one might ask for the decomposition Eq. (1) that minimizes Eq. (2). For larger values of k, one might ask for an algorithm that produces a reasonably small value of Eq. (2). However, that is not the focus of the present invention.

Both the goals and the analysis for the method of the present invention differ significantly from the exponentiation as described in Knuth, supra. The goal in Knuth is to describe efficient methods for computing $x^k$ for a given exponent k. The subsequent analysis gives theoretical upper and lower bounds for the most efficient method and algorithms for taking a given k and finding a reasonably efficient way to evaluate $x^k$. The present goal is to find a collection of exponents k such that $x^k$ is easy to compute and such that the collection is sufficiently "random" and sufficiently large. This seemingly minor change in perspective from specific exponents to random exponents actually represents a major shift in the underlying questions and in the methods that are used to study them.

There is a second important way in which the present invention differs from the factor method as described in Knuth. The present invention is directed to situations in which there is a "free" operation. By way of example, let G be a group and suppose that it is desired to compute $x^k$ using the factor method, where k=uv. The cost of computing $x^k$ is approximately $(\log_2(k) \text{squarings}) + (HW(u) + HW(v)) \text{multiplications})$ where we assume for simplicity that the two powers $y=x^u$ and $z=y^v$ are computed using the binary method. Now suppose that the (finite) group G has order N and suppose that k is written as a product modulo N, say k=uv (mod N). Then $y=x^u$ and $z=y^v$ will still give us the correct value $z=x^k$, but now the cost is approximately $(\log_2(uv) \text{squarings}) + HW(u) + HW(v) \text{multiplications}$ If squaring and multiplication take approximately the same amount of time, then this method will probably be very bad because the product uv will be very large.

On the other hand, if squaring is very fast, as it is for example in the Galois field $F_{2^n}$, then large values of u and v can be advantageous as long as u and v have small (binary) Hamming weight. This will be illustrated, for example, in three situations of cryptographic interest, namely, exponentiation in Galois fields $F_{2^n}$, multiplication on Koblitz elliptic curves, and multiplication in NTRU convolution rings $Fq[X]/(X^N-1)$. These specific situations are described in detail below. Also discussed below are some of the issues surrounding the randomness of small Hamming weight products. Those skilled in the art will realize and be able to utilize this invention in many other applications.

Random Powers in Galois Fields $F_{2^n}$

In any group, the standard way to compute a power $\alpha^k$ is to use the binary expansion of k. This reduces the computation of $\alpha^k$ to approximately $\log_2(k)$ squarings and HW(k) multiples, where on average HW(k) equals approximately ½ $\log_2(k)$. (Using a signed binary expansion of k further reduces the number of multiplies, at the expense of an inversion.)

Binary powering algorithms apply to any group, but the feature exploited by the present invention in $F_{2^n}$ is the fact that squaring is essentially free compared to multiplication. Thus, if k is randomly chosen in the interval from 1 to $2^n-1$, then computation of $\alpha^k$ is dominated by the approximately n/2 multiplications that are required.

As indicated above, there are many cryptographic situations in which a person needs to compute $\alpha^k$ for a fixed base $\alpha$ and some randomly chosen exponent k. Generally, a requirement is that k be chosen from a sufficiently large set that an exhaustive search (or more generally, a square root search such as Pollard's rho method) will be unable to determine k. Thus, suppose that one chooses k to have the form $$k = \sum_{i=0}^{n-1} k_i \cdot 2^i \text{ with } k_i \in \{0, 1\} \qquad (3)$$

with a fixed binary Hamming weight $d = \Sigma k_i$. Then, the size of the search space of k is C(n,d). One typically wants the search space to have at least $2^{160}$ elements, because the running time will typically be proportional to the square root of the size of this space. See Stinson, supra, for a description of Coppersmith's baby-step giant-step algorithm to efficiently search this space in time proportional to $\sqrt{(t\, C(n/2, d/2))}$.

For cryptographic purposes, a typical value for n is n≈1000, which is dictated by the running time of sieve and index calculus methods for solving the discrete logarithm problem over $F_{2^n}$. Then, taking d=25 gives a search space of size C(1000, 25)≈$2^{165}$, and computation of $\alpha^k$ requires 24 multiplications.

The method in accord with the present invention is to choose k to be a product of terms with very low binary Hamming weight. (More generally, one can use a sum of such products.) To illustrate with the above value n≈1000, let k have the form $k = k^{(1)} k^{(2)} k^{(3)};$ where $k^{(1)}$ has binary Hamming weight of 6, and $k^{(2)}$ and $k^{(3)}$ each have binary Hamming weight of 7. Then, the search space for k, which is the product of the search spaces for the three factors, has order (C(1000, 6) C(1000, 7) C(1000, 7))≈$2^{165}$, while computation of $$\alpha^k = ((\alpha^{k(1)})^{k(2)})^{k(3)}$$

requires only 5+6+6=17 multiplications. This represents a savings of approximately 29%.

Preferably, a search space at least of order approximately $2^{160}$ is required because the standard square root search attacks reduce the time to $O(2^{80})$ (Stinson, supra). However, if k is a product of several low Hamming weight polynomials, it is not clear how one would set up a square root attack on the full space. Thus, if $k=k^{(1)}k^{(2)}k^{(3)}$, one can search (guess) the first two terms and then use a square root attack for the third term. A second approach to solving $\alpha^k=\beta$ for k is to transfer $k^{(3)}$ to the other side. Thus, let i run through the space of all products $k^{(1)}k^{(2)}$ and let j run through the space of all $k^{(3)}$ values and make tables of the values of $\alpha^i$ and $\beta^{j^{-1}}$, where $j^{-1}$ is the inverse of j modulo $2^n-1$. Then, the running time is proportional to the sum of the sizes of the two tables.

In the example given above, this yields a running time proportional to (C(1000,6) C(1000, 7))+C(1000, 7)≈$2^{107.7}$. However, in view of this search method, it is preferred to make $k^{(3)}$ considerably larger than $k^{(1)}$ and $k^{(2)}$. Thus, if we select $k^{(1)}$, $k^{(2)}$ and $k^{(3)}$ to have Hamming weights 2, 2, 11, respectively, then, the first square root attack has time $O(2^{80.0})$ and the second square root attack has time $O(2^{84.3})$, while computation of $\alpha^k$ requires only 12 multiplications.

The above discussion can be applied similarly to fields with $p^n$ elements using multipliers of the form $\pm p^{e(1)} \pm \ldots \pm p^{e(r)}$.

Random Multiples on Koblitz Elliptic Curves

Let $E/F_2^m$ be an elliptic curve defined over the field with $2^m$ elements, and let $P \in E(F_2^m)$ be a point on the curve. A number of cryptographic constructions require the computation of a multiple NP, where N has size comparable to $2^m$. Writing N in binary form as $$N=N_0+2N_1+4N_2+\ldots+2^iN_i+\ldots+2^mN_m \text{ with } N_0,\ldots,N_m \in \{0, 1\},$$

the computation of NP is reduced to approximately N/2 doublings and N/2 point additions. As already indicated, further savings may be obtained by choosing $N_0, \ldots, N_m$ in the set $\{-1, 0, 1\}$, reducing the number of additions to approximately N/3. Unfortunately, on elliptic curves, doubling a point is computationally more difficult than adding two different points.

For certain elliptic curves, it is possible to significantly reduce the necessary computation by replacing doubling with a Frobenius map that is essentially free. Let $E/F_2$ be a "Koblitz curve", that is, an ordinary elliptic curve defined over the field with two elements. Thus, E is one of the two curves $$E: y^2+xy=x^3+ax^2+1 \text{ with } a \in F_2.$$

Let $$\tau: E(F_2^m) \to E(F_2^m); \tau(x, y)=(x^2, y^2)$$

be the Frobenius map on E. The computation of $\tau(Q)$ takes very little time compared to point addition or doubling on E. It is possible to write any integer N as a linear combination $$N=N_0+\tau N_1+\tau^2 N_2+\ldots+\tau^i N_i+\ldots+\tau^m N_m \text{ with } N_0,\ldots,N_m \in \{-1, 0, 1\}$$

and, then, the computation of NP is essentially reduced to m/3 additions in $E(F_2^m)$. (Approximately m/3 of the $N_i$'s will be nonzero.) Further, for many cryptographic applications there is no real reason to use integer multiples of P; one can simply use multiples NP where N is a random linear combination of powers of $\tau$, as above. For example, Diffie-Hellman key exchange works perfectly well. See, D. Hankerson, et al., "*Software implementation of elliptic curve cryptography over binary fields*", in *Cryptographic Hardware and Embedded Systems* (CHES 2000), Ç. Koç and C. Paar (eds.), Lecture Notes in Computer Science, Springer-Verlag (to be published); J. Solinas, *Efficient arithmetic on Koblitz curves*, Designs, Codes, and Cryptography 19 (2000), 195–249, for basic material and computational methods on Koblitz curves.

To summarize, computation of a random signed $\tau$-multiple of a point on a Koblitz curve over $F_2^m$ requires approximately m/3 elliptic curve additions. The present invention provides a way to significantly reduce the number of elliptic curve additions. As discussed above, in accord with the present invention, choose the multiplier N to be a product of low Hamming weight linear combinations of $\tau$.

For concreteness, a particular field of cryptographic interest is illustrated. Let m=163, so one is working in the field $F_2^{163}$. Choose N to have the form $$N = N^{(1)}N^{(2)}N^{(3)} = \left(1 + \sum_{u=1}^{6} \pm \tau^{i_u}\right)\left(1 + \sum_{u=1}^{6} \pm \tau^{j_u}\right)\left(1 + \sum_{u=1}^{6} \pm \tau^{k_u}\right). \quad (4)$$

(We take each factor in the form (4), because one can always pull off a power of $\tau$ from each factor. Using this form prevents overcounting.)

First, given Q=NP, check the degree of difficulty to perform a search for N or for some other integer N' satisfying N'P=Q. A square root search (e.g., Pollard rho) for N' takes on the order of $\sqrt{2^{163}}$ steps. A second search, which takes advantage of the special form of N, is to write the equation Q=NP as $$(N^{(3)})^{-1}Q=N^{(1)}N^{(2)}P$$

and compare tables of values of the two sides. The time and space requirement for this search is the length of the longer of the two tables. For this example, each of the $N^{(i)}$'s is taken from a space of size $2^6$ C(162, 6)≈$2^{40.4}$, so the table of values of $N^{(1)}N^{(2)}P$ has $O(2^{80})$ elements. Finally, one could try guessing the values of $N^{(1)}$ and $N^{(2)}$ and perform a square root search for $N^{(3)}$, but this gives an even larger search space.

The advantage of taking N in the above form is clear. Computation of the multiple $$NP=N^{(1)}N^{(2)}N^{(3)}P$$

requires only 6+6+6=18 elliptic curve additions. (Subtractions are essentially the same as additions.) It also requires many applications of powers of the Frobenius map $\tau$, but these take very little time compared to point additions, so may be neglected in this rough analysis. Thus, it can be seen that, with method of the present invention, a useful cryptographic multiple NP can be computed using 18 additions, rather than the approximately 163/3≈54 additions required by the earlier method. Thus, the present invention yields a 3-fold speed increase.

A meet-in-the-middle attack on all of N is not likely, but even if such an attack exists, it suffices to replace the Hamming weights (6, 6, 6) above with the weights (8, 9, 9) to get a set of triples $N^{(1)}$, $N^{(2)}$, $N^{(3)}$ of order $2^{163.9}$. The computation of NP now requires 26 additions, yielding a speed increase by a factor of approximately 2.1. Actually, in this situation it is even faster to use a product of four terms $N=N^{(1)}N^{(2)}N^{(3)}N^{(4)}$ with weights (4, 5, 7, 8). Then, the total search space has size $$2^4C(162, 4) \cdot 2^5C(162, 5) \cdot 2^7C(162, 7) \cdot 2^8C(162, 8) \approx 2^{160.48}$$

and the computation of NP requires only 24 additions for a speed increase by a factor of approximately 2.26.

Alternatively, one can take N to be a sum of products of small Hamming weight terms. For example, $N=N^{(1)}N^{(2)}+N^{(3)}N^{(4)}$ with the four terms having small Hamming weight. Of course, this allows a square root attack for the two halves of N by matching values of aP with values of Q−bP.

Alternatively, N can be an actual integer, rather than a polynomial in τ. Then, one can include conjugate terms. For example, an expression of the form $\tau^1+\tau^{m-1}$ represents an integer, and it is a simple matter to compute and store a table of values of $\tau^i+\tau^{m-i}$ for $1 \leq i \leq m/2$.

The NTRU Public Key Cryptosystem

The NTRU public key cryptosystem uses truncated polynomials in the ring $R=(Z/qZ)[X]/(X^N-1)$. The encryption process includes computation of a product r(X)h(X) for a fixed public key polynomial h(X) and a randomly chosen polynomial r(X) having small coefficients. The decryption process similarly includes computation of a product f(X)e(X), where e(X) is the ciphertext and the private key f(X) is a polynomial with small coefficients. For further details, see Hoffstein (1998), supra.

In general, a computation a(X)b(X) in the ring R is a convolution product of the vectors of coefficients of a and b. The naive algorithm to compute this convolution is $N^2$ steps, where each step is an addition and a multiplication. (If a(X) has coefficients that are randomly distributed in {−1, 0, 1}, then, the computation takes about 2N/3 steps, where now a step is simply an addition or a subtraction.) Other methods such as Karatsuba multiplication or FFT techniques (if applicable) may reduce this to O(N log N) steps, although the big-O constant may be moderately large.

Thus, in accord with the present invention, a small random multiple of h(X) can be computed as a product $$r^{(1)}(X)r^{(2)}(X) \ldots r^{(t)}(X)h(X);$$

where each $r^{(i)}(X)$ has only a few nonzero terms. Then, the amount of computation needed is proportional to the sum of the number of nonzero terms, while the size of the sample space is approximately equal to the product of the sample spaces for the $r^{(i)}$.

For example, let N=251 and take $$r(X)=r^{(1)}(X)r^{(2)}(X)$$

where $r^{(1)}$ and $r^{(2)}$ are polynomials with exactly eight nonzero coefficients, four 1's and four −1's. To avoid too much duplication, preferably $r^{(i)}(0)=1$, so only three of the 1's are randomly placed. Then, the number of such r(X) polynomials is approximately $C(250, 3) C(247, 4) \cdot C(250, 3) C(247, 4) \cdot \frac{1}{2} \approx 2^{95.94}$. If one tries to guess $r^{(1)}(X)$ and then use a square root search for $r^{(2)}(X)$, this leads to a search algorithm of length approximately $(C(250, 3) C(247, 4)) \cdot \sqrt{(C(250, 3) C(247, 4))} \cdot \frac{1}{2} \approx 2^{71.1}$. The computation of the product r(X)h(X) is reduced to approximately 16N additions and subtractions. Notice that r(X) itself has about 64 nonzero coefficients, so a direct computation of r(X)h(X) requires almost 4 times as many elementary operations.

A similar construction can be used for the NTRU private key f(X), leading to a similar computational speedup for decryption.

Randomness of Small Hamming Weight Products

There are many ways of measuring randomness known to those skilled in the art. For concreteness, let $B_N(D)=\{$binary polynomials of degree N−1 with D ones$\}$. That is, elements of $B_N(D)$ are polynomials $$a_0+a_1X+a_2X_2+ \ldots +a_{N-1}X_{N-1}$$

with $a_i \in \{0, 1\}$ and $\Sigma a_i = D$. As described previously, polynomials are multiplied using the convolution rule $X^N=1$.

Products of polynomials are subject to a natural rotation of their coefficients by multiplying by powers of X. In other words, any product can be rewritten as $$a(X)*b(X)=(X^k*a(X))*(X^{N-k}*b(X))$$

Such rotations are far from random, so preferably they are discouraged in the sample spaces. Thus, let $$B^*_N(D)=\{a(X)=a_0+a_1X+ \ldots +a_{N-1}X^{N-1} \in B_N(D): a_0=1\}$$

be the subset of $B_N(D)$ consisting of polynomials whose constant coefficient is nonzero.

Compare the space of random binary polynomials $B^*_N(D)$ with the space of products $$P^*_N(d_1,d_2)=\{c(X)=a(X)*b(X): a(X) \in B^*_N(d_1), b(X) \in B^*_N(d_2), c(X) \in B^*_N(d_1d_2)\}$$

Notice that we are only considering polynomials a(X) and b(X) whose product a(X)*b(X) is binary. In practice, this can require generating a number of pairs (a, b) at random, multiplying them, and discarding the product if it is not of the appropriate form.

How can one compare the set of products $P^*_N(d_1, d_2)$ with the truly random set $B^*_N(d_1,d_2)$? In general, the former set will be much smaller than the latter set, so that each element of $B^*_N(d_1,d_2)$ is not equally likely to be hit by an element of $P^*_N(d_1,d_2)$. Experimentally, elements of $P^*_N(d_1,d_2)$ generally have a unique representation as a product. Preferably, Hamming weight differences are used to determine the extent to which elements of $P^*_N(d_1,d_2)$ are randomly distributed in the space $B^*_N(d_1,d_2)$. For any two binary polynomials a(X) and b(X), their Hamming weight difference can be defined to be $$HWD(a, b)=\#\{i: a_i \neq b\}$$

It is easy to compute the probability that a randomly chosen pair in $B^*_N(D)$ will have a given Hamming weight difference. More precisely, for any fixed $a \subset B^*_N(D)$, if the known constant coefficient is ignored, there are D−1 ones and N−D zeros. Suppose that $b \in B_N(D)$ has k of its ones in common with the ones of a. Then, HWD(a, b) gains D−1−k from the ones in a that are hit by zeros of b and it gains D−1−k from the ones of b that hit zeros of a, so HWD(a, b)=2(D−1−k). Thus, the Hamming weight difference is always even and it will equal 2*h when exactly D−1−h of the ones of a and b coincide. Dividing the number of ways that this can happen by the total number of polynomials, for a fixed $a \in B^*_N(D)$, the probability that a randomly chosen $b \in B^*_N(D)$ is Hamming weight distance 2*h from a is given by $$\Pr_{b \in B_N^*(D)}(HWD(a,b) = 2*h) = \frac{\binom{D-1}{D-1-h}\binom{N-D}{h}}{\binom{N-1}{D-1}}. \quad (5)$$

It is more difficult to compute exactly the analogous probability for a randomly chosen $b \in P^*_N(d_1, d_2)$, so a computer simulation was used. 10,000 polynomials were chosen randomly from the sets $$B=B^*_{251}(64) \text{ and } P=P^*_{251}(8, 8)$$

We computed the distributions of Hamming weight differences $HWD(a, b)$ for all $10^8$ pairs $(a, b)$ chosen from each of the sets B×B, B×P, and P×P. The results are listed in Table 1, together with the theoretical expected value from the formula (5). It seems clear from the table that there is no discernable difference in $HWD(a, b)$ in the various situations studied.

TABLE 1

Hamming weight difference probabilities

| Hamming Wt Difference | Experimental B vs B | B vs P | P vs P | Theoretical B vs B |
|---|---|---|---|---|
| 68 | 0.002% | 0.002% | 0.002% | 0.002% |
| 70 | 0.006% | 0.006% | 0.006% | 0.006% |
| 72 | 0.019% | 0.019% | 0.020% | 0.019% |
| 74 | 0.057% | 0.057% | 0.058% | 0.057% |
| 76 | 0.155% | 0.155% | 0.158% | 0.155% |
| 78 | 0.380% | 0.380% | 0.381% | 0.379% |
| 80 | 0.841% | 0.843% | 0.841% | 0.841% |
| 82 | 1.692% | 1.691% | 1.688% | 1.691% |
| 84 | 3.079% | 3.082% | 3.074% | 3.080% |
| 86 | 5.072% | 5.071% | 5.063% | 5.072% |
| 88 | 7.542% | 7.539% | 7.537% | 7.545% |
| 90 | 10.121% | 10.118% | 10.123% | 10.124% |
| 92 | 12.234% | 12.228% | 12.236% | 12.229% |
| 94 | 13.265% | 13.271% | 13.287% | 13.270% |
| 96 | 12.904% | 12.901% | 12.917% | 12.901% |
| 98 | 11.209% | 11.208% | 11.200% | 11.203% |
| 100 | 8.660% | 8.657% | 8.653% | 8.658% |
| 102 | 5.928% | 5.929% | 5.923% | 5.928% |
| 104 | 3.578% | 3.581% | 3.572% | 3.578% |
| 106 | 1.889% | 1.891% | 1.888% | 1.892% |
| 108 | 0.867% | 0.869% | 0.868% | 0.869% |
| 110 | 0.343% | 0.343% | 0.345% | 0.344% |
| 112 | 0.115% | 0.115% | 0.117% | 0.116% |
| 114 | 0.032% | 0.033% | 0.033% | 0.033% |
| 116 | 0.007% | 0.008% | 0.008% | 0.008% |
| 118 | 0.001% | 0.001% | 0.001% | 0.001% |

A General Formulation of Small Hamming Weight Products

All of the above constructions can be formulated quite generally in terms of a ring R, an R-module M, and a subset $S \subset R$ with the two properties: (i) the set S is "sufficiently large" and (ii) the computation of products $r \cdot m$ for $r \in S$ and $m \in M$ is "computationally easy." These properties are, to some extent, antagonistic to one another, because presumably the larger the set S, the harder on average it is to compute products $r \cdot m$ for $r \subset S$.

One way to construct the set S is to choose a collection of smaller subsets $S_1, \ldots, S_t \subset R$ and let $$S = \{r_1 \ldots r_t : r_1 \subset S_1, \ldots, r_t \subset S_t\}$$

Under suitable hypotheses, the size of the set S is approximately the product of the sizes of $S_1, \ldots, S_t$. Each $S_1$ has the property (ii).

Let there be one particular element $\tau \subset R$ such that the product $\tau \cdot m$ is easy to compute for every $m \subset M$. Then, $S_i$ are preferably selected from low Hamming weight polynomials in $\tau$; that is, $S_i$ preferably consists of all elements of r of the form $$\tau^{j_1} + \tau^{j_2} + \ldots + \tau^{j_d}$$

for some fixed $d = d_1$ (or for some random $d \leq D_i$ for a fixed $D_1$). Of course, if it is easy to compute inverses $-m$, then one can increase the size of $S_i$ by using $$\pm \tau^{j_1} \pm \tau^{j_2} \pm \tau^{j_3} \pm \ldots \pm \tau^{j_d}$$

Similarly, if there are several easy-to-multiply elements $\tau_1, \ldots, \tau_u \subset R$, then, one can take low Hamming weight polynomials in the u "variables" $\tau_1, \ldots, \tau_u$, further increasing the size of the special sets $S_i$.

Relating this general formulation to the examples discussed above, the following is noted:

1. For Powers in $F2^n$

The ring is R=Z, the R-module is the multiplicative group $M=(F_2^n)^*$, and the special map $\tau$ is the doubling (i.e., squaring) map $\tau(\alpha)=\alpha^2$.

2. For Multiples on Koblitz Curves

The ring is $R=End(E(F_2^m))$ (i.e., the ring of homomorphism from $E(F_2^m)$ to itself), the R-module is $M=E(F_2^m)$, and the special map $\tau$ is the Frobenius map $\tau(x, y)=(x^2, y^2)$.

3. For the NTRU Cryptosystem

The ring is $R=Z[X]/(X^N-1)$, the R-module is M=R (i.e., R acts on itself via multiplication), and the special map $\tau$ is the multiplication-by-X map $\tau(f(X))=Xf(X)$.

This illustrates how Small Hamming Weight Products apply to these particular situations and also illustrates the widespread applicability of the invention.

The size of S, where the set S is the image of the map $$S_1 \times S_2 \times \ldots \times S_t \to R, (r_1, r_2, \ldots, r_t) \to r_1 r_2 \ldots r_t$$

can be partially quantified as follows. In practice, it is usually not hard to describe a natural set $T \subset R$ with the property that $S \subset T$ and with the property that a random t-tuple $(r_1, \ldots, r_t)$ of $S_1 \times \ldots \times S_t$ appears to have an equal chance of hitting each element of T. (Note: It may be difficult to rigorously prove that T has this property, but usually at least one can obtain experimental evidence.) Let $N_i = |S_i|$ for the size of the set $S_i$ and $M=|T|$ for the size of the set T. Then, using elementary probability theory, those skilled in the art can estimate the expected number of distinct elements when $N_1 N_2 \ldots N_t$ elements of T are chosen randomly with replacement.

The present invention has been described in detail including the preferred embodiments thereof. However, it will be understood that, upon consideration of the present specification, those skilled in the art may make modifications and/or improvements within the spirit and scope of this invention. The techniques of the present invention provide significantly improved computational efficiency relative to the prior art techniques. It should be emphasized that the techniques described above are exemplary and should not be construed as limiting the present invention to a particular group of illustrative embodiments.

The disclosures of all references listed herein are hereby incorporated in their entirety by reference. Additionally, the disclosures in the publications, D. Gordon, *A survey of fast exponentiation methods,* Journal of Algorithms 27 (1998), 129–146 and D. Stinson, *Cryptography: Theory and Practice*, CRC Press, 1997, are also incorporated by reference.

What is claimed is:

1. A method for performing a cryptographic operation that comprises transforming digital information, the method comprising:
   providing digital information;
   providing a digital operator having a component selected from a large set of elements;
   expanding the component into a plurality of factors, each factor having a low hamming weight; and
   transforming the digital information using the digital operator, said transforming comprising computing multiples;
   said method further comprising:
   selecting a ring R;
   selecting an R-module M;
   selecting two or more subsets $R_1, R_2, \ldots, R_k$ of R with the property that $r_1$ is an element in $R_1$, $r_2$ is an element in $R_2, \ldots$ and $r_k$ is an element in $R_k$;
   computing r*m, where r is in R and m is in M, by expanding r as $r_1 * r_2 \ldots r_k$, where k is an integer and computing the quantity $r_1*(r_2*(\ldots (r_k*m))$.

2. The method of claim 1, wherein the cryptographic operation is selected from a group consisting of key generation, encryption, decryption, creation of a digital signature, verification of a digital signature, creation of a digital certificate, authentication of a digital certificate, identification, pseudorandom number generation and computation of a hash function.

3. The method of claim 1, wherein each $r_k$ has a Hamming weight that is less than about 15.

4. The method of claim 1, wherein each $r_k$ has a Hamming weight that is less than about 10.

5. The method of claim 1, wherein the subset $R_i$ is a subset of R consisting of elements of the form, $$a_1 t^{e(1)} + a_2 t^{e(2)} + \ldots + a_n t^{e(n)},$$

where n is an integer.

6. The method of claim 5, wherein each of the elements $a_1, \ldots, a_n$ are chosen from the set $\{0,1\}$.

7. The method of claim 5, wherein each of the elements $a_1, \ldots, a_n$ are chosen from the set $\{-1,0,1\}$.

8. The method of claim 1, wherein the subset $R_i$ is a subset of R consisting of polynomials in elements of $t_1, \ldots, t_k$ of R having coefficients $a_1, \ldots, a_k$ taken from a subset A of R where k is an integer.

9. The method of claim 8, wherein each of the coefficients $a_1, \ldots, a_k$ is chosen from the set $\{0,1\}$.

10. The method of claim 8, wherein each of the coefficients $a_1, \ldots, a_k$ is chosen from the set $\{-1,0,1\}$.

11. The method of claim 1, wherein the ring R is the ring of integers, the R-module M is a group of nonzero elements in the field $GF(p^m)$ with $p^m$ elements, and wherein the subsets $R_1, \ldots, R_k$ consist of integers of the form $$a_1 p^{e(1)} + a_2 p^{e(2)} + \ldots + a_n p^{e(n)},$$

wherein n is an integer that is less than m and wherein $a_1, \ldots, a_n$ are elements of the set $\{0,1\}$.

12. The method of claim 1, wherein the ring R is the ring of integers, the R-module M is a group of nonzero elements in the field $GF(p^m)$ with $p^m$ elements, and wherein the subsets $R_1, \ldots, R_k$ consist of integers of the form $$a_1 p^{e(1)} + a_2 p^{e(2)} + \ldots + a_n p^{e(n)},$$

wherein n is an integer that is less than m and wherein $a_1, \ldots, a_n$ are elements of a small set of integers A.

13. The method of claim 1, wherein the ring R is an endomorphism ring of a group of points E(GF(q)) of an elliptic curve E over a finite field GF(q).

14. The method of claim 1, wherein the module M is a group of points e(GF(q)) of an elliptic curve E over a finite field GF(q).

15. The method of claim 5, wherein the ring R is an endomorphism ring of a group of points E(GF(q)) of an elliptic curve E over a finite field GF(q) of characteristic p, wherein the module M is a group of points E(GF(q)) and wherein the element t is a p-power Frobenius map.

16. The method of claim 5, wherein the ring R is an endomorphism ring of a group of points E(GF(q)) of an elliptic curve E over a finite field GF(q) of characteristic p, wherein the module M is a group of points E(GF(q)) and wherein the element t is a point halving map.

17. The method of claim 1, wherein the ring R is a ring of polynomials modulo an ideal A[X]/I, wherein A is a ring and I is an ideal of A[X], and wherein the subsets $R_1, \ldots, R_k$ are sets of polynomials with few nonzero terms.

18. The method of claim 17, wherein the ideal I is the ideal generated by the polynomimial $X^N - 1$.

19. The method of claim 17, wherein the ring R is a finite ring Z/qZ of integers modulo q, wherein q is a positive integer.

20. The method of claim 5, wherein the ring R is a ring of polynomials modulo an ideal A[X]/I, wherein A is a ring and I is an ideal of A[X], and wherein the element t is the polynomial X in R.

21. The method of claim 20, wherein the deal I is the ideal generated by the polynomimial $X^N - 1$.

22. The method of claim 20, wherein the ring R is a finite ring Z/qZ of integers modulo q, wherein q is a positive integer.

23. A computer readable medium containing instructions for a method for performing a cryptographic operation that comprises transforming digital information, the method comprising:
   providing digital information;
   providing a digital operator having a component selected from a large set of elements;
   expanding the component into a plurality of factors, each factor having a low hamming weight; and
   transforming the digital information using the digital operator, said transforming comprising computing multiples;
   said method further comprising:
   selecting a ring R;
   selecting an R-module M;
   selecting two or more subsets $R_1, R_2, \ldots, R_k$ of R with the property that $r_1$ is an element in $R_1$, $r_2$ is an element in $R_2, \ldots$ and $r_k$ is an element in $R_k$;
   computing r*m, where r is in R and m is in M, by expanding r as $r_1 * r_2 \ldots r_k$, where k is an integer and computing the quantity $r_1*(r_2*(\ldots (r_k*m))$.

24. The computer readable medium of claim 23, containing instructions for a method wherein the subset $R_i$ is a subset of R consisting of elements of the form, $$a_1 t^{e(1)} + a_2 t^{e(2)} + \ldots + a_n t^{e(n)},$$

where n is an integer.

25. The computer readable medium of claim 23, containing instructions for a method wherein the subset $R_i$ is a subset of R consisting of polynomials in elements of $t_1, \ldots, t_k$ of R having coefficients $a_1, \ldots, a_k$ taken from a subset A of R where k is an integer.

26. The computer readable medium of claim 23, containing instructions for a method wherein the ring R is the ring of integers, the R-module M is a group of nonzero elements in the field $GF(p^m)$ with $p^m$ elements, and wherein the subsets $R_1, \ldots, R_k$ consist of integers of the form $$a_1 p^{e(1)} + a_2 p^{e(2)} + \ldots + a_n p^{e(n)},$$

wherein n is an integer that is less than m and wherein $a_1, \ldots, a_n$ are elements of the set $\{0,1\}$.

27. The computer readable medium of claim 23, containing instructions for a method wherein the ring R is the ring of integers, the R-module M is a group of nonzero elements in the field $GF(p^m)$ with $p^m$ elements, and wherein the subsets $R_1, \ldots, R_k$ consist of integers of the form $$a_1 p^{e(1)} + a_2 p^{e(2)} + \ldots + a_n p^{e(n)},$$

wherein n is an integer that is less than m and wherein $a_1, \ldots, a_n$ are elements of a small set of integers A.

28. The computer readable medium of claim 23, containing instructions for a method wherein the ring R is an endomorphism ring of a group of points E(GF(q)) of an elliptic curve E over a finite field GF(q).

29. The computer readable medium of claim 23, containing instructions for a method wherein the module M is a group of points e(GF(q)) of an elliptic curve E over a finite field GF(q).

30. The computer readable medium of claim 24, containing instructions for a method wherein the ring R is an endomorphism ring of a group of points E(GF(q)) of an elliptic curve E over a finite field GF(q) of characteristic p, wherein the module M is a group of points E(GF(q)) and wherein the element t is a p-power Frobenius map.

31. The computer readable medium of claim 24, containing instructions for a method wherein the ring R is an endomorphism ring of a group of points E(GF(q)) of an elliptic curve E over a finite field GF(q) of characteristic p, wherein the module M is a group of points E(GF(q)) and wherein the element t is a point halving map.

32. The computer readable medium of claim 23, containing instructions for a method wherein the ring R is a ring of polynomials modulo an ideal A[X]/I, wherein A is a ring and I is an ideal of A[X], and wherein the subsets $R_1, \ldots, R_k$ are sets of polynomials with few nonzero terms.

33. The computer readable medium of claim 24, containing instructions for a method wherein the ring R is a ring of polynomials modulo an ideal A[X]/I, wherein A is a ring and I is an ideal of A[X], and wherein the element t is the polynomial X in R.

* * * * *